No. 624,474. Patented May 9, 1899.
E. M. FREEMAN.
TIRE TIGHTENER.
(Application filed July 5, 1898.)
(No Model.)
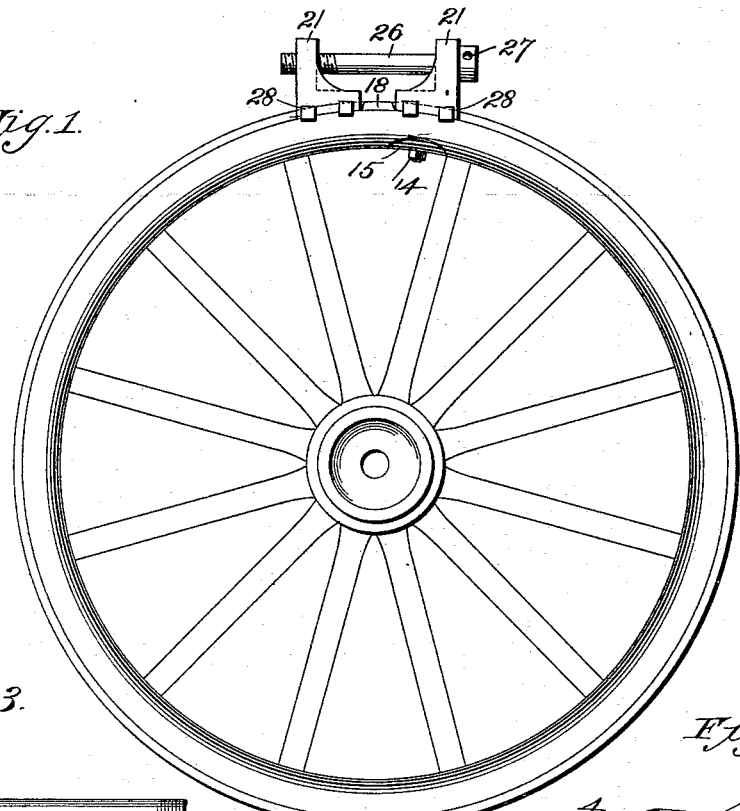
Fig. 1.
Fig. 3.
Fig. 4.
Fig. 5.
Fig. 2.
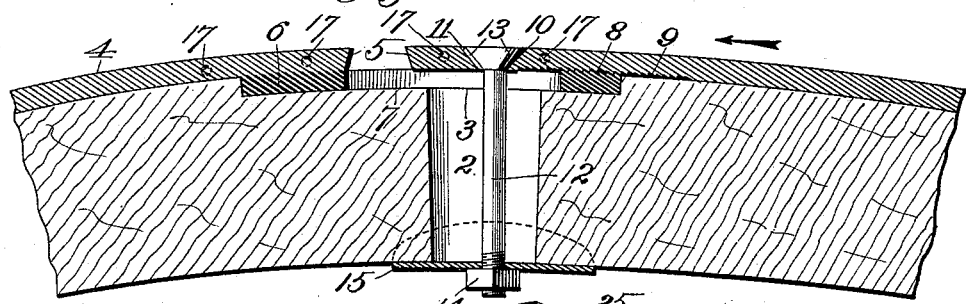
Witnesses:
M. R. Remley
G. Y. Thorpe
Fig. 6.
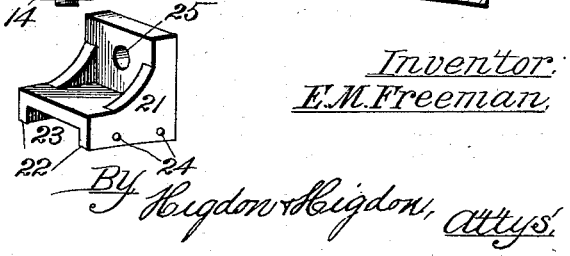
Inventor:
E. M. Freeman,
By Higdon & Higdon, attys.
THE NORRIS PETERS CO., PHOTO-LITHO., WASHINGTON, D. C.

UNITED STATES PATENT OFFICE.

EUGENE M. FREEMAN, OF DAVIS, INDIAN TERRITORY.

TIRE-TIGHTENER.

SPECIFICATION forming part of Letters Patent No. 624,474, dated May 9, 1899.

Application filed July 5, 1898. Serial No. 685,196. (No model.)

*To all whom it may concern:*

Be it known that I, EUGENE M. FREEMAN, of Davis, Indian Territory, have invented certain new and useful Improvements in Adjustable Tires and Adjusting Appliances Therefor, of which the following is a full, clear, and exact description, reference being had to the accompanying drawings, forming a part thereof.

My invention relates to adjustable tires and adjusting appliances therefor, and is designed more especially as an improvement on that class of devices of the character above mentioned which may be contracted to accommodate shrinkage of the wheel to which the tire is to be applied; and the object of the invention is to produce a device of this character which combines simplicity, strength, durability, and cheapness of manufacture.

To these ends the invention consists in certain novel and peculiar features of construction and combinations of parts, as will be hereinafter described and claimed.

In order that the invention may be fully understood, I will proceed to describe it with reference to the accompanying drawings, in which—

Figure 1 is a side view of a wheel provided with my adjustable tire and appliances for adjusting the same. Fig. 2 is an enlarged sectional view of the felly and the meeting ends of the tire. Fig. 3 is a plan view of the meeting ends of the tire. Fig. 4 is a perspective view of one end of the tire. Fig. 5 is a perspective view of a removable block adapted to close the space between the meeting ends of the tire. Fig. 6 is a perspective view of a chair or bracket forming part of the adjusting appliance.

In the drawings, 1 designates a wheel of the usual or any preferred construction, except that its felly is provided at a suitable point with a radial slot 2 and a cavity or recess 3, the latter being formed in the periphery of the felly and communicating with the slot 2.

4 designates the tire, of spring metal. It forms almost a complete circle, and its opposite ends are beveled convergingly outward, as shown at 5, for a purpose which will hereinafter appear.

A plate 6 is welded to the under side of one end of the tire and fits snugly in the recess or cavity 3 of the felly, so as to practically anchor or lock the end of the tire to which it is attached from slipping on the wheel. This plate is provided centrally with a longitudinal slot 7, extending from the corresponding end of the tire to about the opposite or off side of the slot 2 of the felly, with which it communicates or registers, and at its free end, or that adjacent to the off side of said slot, is provided on its outer side with a series of transverse ratchet-teeth 8, adapted for engagement with the oppositely-disposed similar teeth 9, formed in the under side of the opposite end of the tire, as shown clearly in Fig. 2. Said end of the tire is also formed with a countersunk hole 10, registering with the slots 2 and 7, and opening into said countersunk hole is one or more grooves 11.

12 designates a clamping-bolt which extends through said slots with its beveled head fitting snugly in the countersunk hole 10 and provided with a corresponding number of ribs 13, which engage the grooves 11 and thereby prevent the turning of said bolt. Said bolt is clamped firmly and reliably in position by means of a nut 14 engaging its inner or threaded end and clamping against the felly the elongated washer 15, said washer being of such length that it will cover the slot 2 irrespective of the position of the bolt 12 therein, and consequently will prevent the access of water thereto, which in time would result in the destruction of the felly by rotting and of the teeth 8 and 9 by rust. The washer 15 is of curved form in cross-section, so as to fit snugly the corresponding surface of the felly and thereby be prevented from turning upon the bolt.

In case the tire, as above described, is of the ordinary type the plate 6, welded thereto, may be of equal width; but where the tire is of the flanged type—that is to say, is provided with inwardly-projecting marginal flanges, as shown at 16—the said plate 6 should be made slightly narrower in order to fit snugly between said inwardly-projecting flanges, (see Fig. 3,) and in either case each end of the tire should be provided at one side with a pair of indentures 17 to render more convenient the connection therewith of the adjusting appliances, to be presently described. In either case also the use of a block for closing the space between the ends of the tire is necessary, and owing to the fact that the distance between said ends will constantly diminish, due to the constant contraction or shrinkage of the wheel, it is necessary to provide a plurality of such blocks, all of them varying in width. This block (numbered 18) is beveled convergingly outward at its sides, so as to correspond with the beveled ends 5 and dovetail between them. The dovetail relation thus established prevents the block from dropping out of position, and in order to prevent it from sliding laterally from position I provide it centrally with a depending rib 19, which fits snugly in the slot 7 of the plate 6. The use of this depending rib, however, precludes the sliding of the block into position and renders it necessary to place the block between the ends of the tire before the latter is contracted sufficiently to snugly embrace it by means which will be presently described. Preliminary to such description, however, it should be stated that if the flanged type of tire is used the block will also be provided with inwardly-projecting flanges 20, so as to preserve the continuity of effect presented to the eye by the flange 16 of the tire. In this case also, as said flanges will fit snugly against the opposite edges of the plate 6, the locking-rib 19 may be dispensed with, but it will be preferable to employ the same, because the flanges are more apt to be broken, due to the fact that they are not as heavy and are exposed to contact with objects on the street.

Referring now to the adjusting devices, 21 designates a pair of chairs or angle-brackets, each of which is provided at its side margins with depending flanges 22, so as to form the interposed groove 23, and said flanges are provided with the alined holes 24, said holes being adapted to register with the indentures 17 of the tire. The back of each chair is also provided with a hole 25, one of which is preferably screw-threaded to be engaged by clamping-bolt 26, said clamping-bolt being provided with a radial hole 27 in its headed end to receive the end of a lever or rod, (not shown,) whereby greater leverage may be obtained than by the use of a wrench in engagement with the head of said bolt.

To assemble the adjusting appliances in position, one of the chairs is fitted upon each end of the tire, so that the latter engages snugly the grooves of the chairs, with holes 28 and indentures 17 in line. Set-screws 28 are then engaged with said registering holes and indentures to reliably secure the chairs or brackets in position upon the tire. The bolt 26 is now turned, which causes the end of the tire overlapping the plate 6 to move in the direction indicated by the arrow, Fig. 2, this arrangement representing the contraction or diametric reduction of the tire, because the opposite end is anchored and cannot move. Owing to the fact that the teeth 8 and 9 are very narrow it is obvious that a very fine adjustment can be had and that the adjustment is reliably maintained because a plurality of teeth are engaged at the same time and the strain thereby equally distributed over a large area. The adjustment of the end of the tire, as explained, causes a corresponding movement of the bolt 12 in the slot 2; but the latter is never uncovered, because the washer is made sufficiently long to constantly bridge the slot. When the operator sees that the tire is nearly tight enough, he places between the ends of the tire, upon the plate 6 and with its rib 19 engaging the slot 7, the block 18, formed with or without the flanges 20, accordingly as the tire is of the flanged or unflanged type. He then manipulates the bolt 26, as before, until the overlapping or toothed end of the tire clamps the block 18 firmly and reliably between it and the anchored end of the tire, and thereby establishes a dovetail relation between the tire and said block. Said relation is made permanent and reliable by the proper manipulation of the nut 14, whereby the bolt 12 is caused to clamp the overlapping end of said tire firmly upon the plate 6, so that there will be no possibility of accidental disengagement of the teeth 8 and 9. The tire now presents a complete unbroken surface, and without close inspection the block 5 is unobservable. The set-screws 28 being now withdrawn from the indentures of the tire and the chairs removed, the wheel is ready for service, and the constant jolting received by the same will not cause the end 14 to become unscrewed, because the bolt 12 is prevented from rotatable movement by its ribs 13 engaging the grooves 11 of the tire.

From the above description it will be apparent that I have produced an adjustable tire and adjusting appliances therefor which are simple, durable, inexpensive of construction, and reliable in operation, and it is to be understood, of course, that changes in the form, proportion, or arrangement of parts or the substitution of mechanical equivalents will not be considered a departure from the spirit and scope of the invention nor sacrifice any of the advantages of the same.

Having thus described the invention, what I claim as new, and desire to secure by Letters Patent, is—

In a device of the character described, a tire almost a complete circle in form, and provided near one end with teeth at its under side and a countersunk hole and grooves opening therein, a slotted plate secured to and projecting from the under side of the opposite end of the tire, and provided with teeth engaging those first named, a bolt extending through said slot and provided with a screw-head engaging said countersunk hole and ribs engaging said grooves, and a nut to clamp the toothed ends of the tire firmly into engagement with the slotted plate, substantially as described.

In testimony whereof I affix my signature in the presence of two witnesses.

EUGENE M. FREEMAN.

Witnesses:
  G. Y. THORPE,
  M. R. REMLEY.